US009739509B2

(12) United States Patent
Buscheck

(10) Patent No.: US 9,739,509 B2
(45) Date of Patent: *Aug. 22, 2017

(54) MULTI-FLUID RENEWABLE GEO-ENERGY SYSTEMS AND METHODS

(71) Applicant: Lawrence Livermore National Security, LLC, Livermore, CA (US)

(72) Inventor: Thomas A. Buscheck, Pleasanton, CA (US)

(73) Assignee: Lawrence Livermore National Laboratory, Livermore, CA (US)

(*) Notice: Subject to any disclaimer, the term of this patent is extended or adjusted under 35 U.S.C. 154(b) by 387 days.

This patent is subject to a terminal disclaimer.

(21) Appl. No.: 14/310,070

(22) Filed: Jun. 20, 2014

(65) Prior Publication Data

US 2015/0369521 A1 Dec. 24, 2015

(51) Int. Cl.
| F24J 3/08 | (2006.01) |
| F03G 7/04 | (2006.01) |
| F28D 20/00 | (2006.01) |
| F03D 9/17 | (2016.01) |
| F02C 1/00 | (2006.01) |

(52) U.S. Cl.
CPC ............ *F24J 3/085* (2013.01); *F02C 1/00* (2013.01); *F03D 9/17* (2016.05); *F03G 7/04* (2013.01); *F28D 20/0052* (2013.01); *F24J 2003/089* (2013.01); *Y02E 10/14* (2013.01); *Y02E 10/72* (2013.01); *Y02E 60/142* (2013.01); *Y02E 60/15* (2013.01); *Y02E 70/30* (2013.01)

(58) Field of Classification Search
CPC .................................. F24J 3/085; F03G 7/04

USPC ........................................................ 60/641.2
See application file for complete search history.

(56) References Cited

U.S. PATENT DOCUMENTS

| 8,316,955 B2 | 11/2012 | Saar et al. | |
| 8,833,475 B2 | 9/2014 | Saar et al. | |
| 2006/0048770 A1* | 3/2006 | Meksvanh | E21B 41/0057 126/620 |

(Continued)

FOREIGN PATENT DOCUMENTS

| AU | 2010223059 A1 | 9/2011 |
| CA | 2753393 A1 | 9/2010 |
| EP | 2406562 A2 | 1/2012 |

OTHER PUBLICATIONS

Buscheck et al. (Analysis of Operational Strategies for Utilizing CO2 for Geothermal Energy Production—SGP-TR-198) Feb. 11, 2013.*

*Primary Examiner* — George Gray
(74) *Attorney, Agent, or Firm* — Harness & Dickey & Pierce PLC

(57) ABSTRACT

A geo-energy production method for extracting thermal energy from a reservoir formation. A production well extracts brine from the reservoir formation. A plurality of working fluid injection ("WFI") wells may be arranged proximate to the production well to at least partially circumscribe the production well. A plurality of brine production ("BP") wells may be arranged in a vicinity of the WFI wells to at least partially circumscribe the WFI wells. A working fluid is injected into the WFI wells to help drive a flow of the brine up through the production and BP wells, together with at least a portion of the injected working fluid. Parasitic-load time-shifting and to storing of excess solar thermal energy may also be performed.

22 Claims, 5 Drawing Sheets

(56) References Cited

U.S. PATENT DOCUMENTS

| | | | |
|---|---|---|---|
| 2010/0071366 A1* | 3/2010 | Klemencic | F03G 7/04 |
| | | | 60/641.2 |
| 2011/0126539 A1* | 6/2011 | Ramaswamy | F01K 25/08 |
| | | | 60/641.2 |
| 2011/0137480 A1* | 6/2011 | Sampson | G05B 13/021 |
| | | | 700/288 |
| 2013/0043678 A1 | 2/2013 | Saar et al. | |
| 2013/0056171 A1* | 3/2013 | Klemencic | F03G 7/04 |
| | | | 165/45 |
| 2014/0130498 A1 | 5/2014 | Randolph | |

\* cited by examiner

MULTI-FLUID RENEWABLE GEO-ENERGY SYSTEMS AND METHODS

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to multi-fluid, renewable geo-energy systems and methods, and more particularly to multi-fluid, geothermal and geo-energy systems and methods that employ one or more concentric rings of working fluid injection wells that at least partially circumscribe one or more production wells, and which employ a ring of brine production wells that at least partially circumscribe the working fluid injection wells, and which employ supplemental working fluids, in addition to native brine, and related methods to enhance the production of brine and supplemental fluid in a manner to increase the overall efficiency of a geothermal energy system, as well as systems and methods for synergistically harvesting, storing and dispatching renewable energy sources in renewable geo-energy systems to provide large-scale, diurnal-to-seasonal storage of both thermal and bulk energy and electrical-grid stabilizing, power-generation capacity.

BACKGROUND

The statements in this section merely provide background information related to the present disclosure and may not constitute prior art.

Climate change mitigation requires a range of measures to reduce carbon dioxide ($CO_2$) emissions to the atmosphere. Two of the most important measures include increasing reliance on technologies that generate electricity from renewable resources and reducing the $CO_2$ intensity of fossil energy use. Despite providing reliable and predictable power, geothermal resources are underutilized relative to their vast resource potential. Challenges that have heretofore limited geothermal deployment include (1) the cost and risk of prospecting and well drilling, (2) parasitic power cost of fluid recirculation, and (3) geographically limited range of geologic settings amenable to the current generation of hydrothermal geothermal power systems. Geologic $CO_2$ storage (GCS) has received considerable attention as a means of reducing the $CO_2$ intensity of fossil-energy systems. But the high cost of supplying $CO_2$ by capturing it from exhaust streams requires valuable uses for $CO_2$ to justify those costs.

Wind and solar are renewable energy sources with enormous resource potential. However, such energy sources are difficult to predict and are temporally variable, both diurnally and seasonally. Until major advances in both thermal energy storage (TES) and bulk energy storage (BES) technology are commercialized, wind and solar energy technologies will require back-up, load-following, and peaking power sources, which often emit a significant quantity of $CO_2$. The temporal nature of the major renewable power sources (primarily wind and solar, but in some instances, hydro) may also result in costly power curtailments to other low-$CO_2$ power sources (e.g., nuclear power plants). These drawbacks are setbacks in attempts to mitigate climate change. To effectively meet goals for reduced $CO_2$ emissions, integrating electricity generated from wind and solar resources into power grids requires that their diurnal and seasonal variability and unpredictability be addressed with minimal reliance on $CO_2$-intensive back-up and grid-stabilizing (e.g., load-following) power sources, and without displacing other low-$CO_2$ power sources.

SUMMARY

In one aspect the present disclosure relates to a geothermal energy production method for extracting geothermal energy from a reservoir formation. The method may comprise using a production well to extract brine from the reservoir formation. A plurality of working fluid injection wells may be arranged in a vicinity of the production well to at least partially circumscribe the production well. A plurality of brine production wells may be arranged in a vicinity of the working fluid injection wells to at least partially circumscribe the working fluid injection wells. Native brine may be injected into some of the working fluid injection wells. Prior to being injected, brine may be thermally augmented by either heating, using a combination of solar thermal energy, waste heat, or geothermal heat from a separate reservoir, or by cooling, using a source of chilled thermal energy. A supplemental working fluid may be injected into some of the working fluid injection wells to augment a pressure in the reservoir formation, to thus drive a flow of the brine up through the production well and up through the brine production wells, together with at least a portion of the supplemental working fluid.

In another aspect the present disclosure relates to a geothermal energy production method for extracting geothermal energy from a reservoir formation. The method may comprise using a production well to extract brine from the reservoir formation, and arranging a plurality of working fluid injection wells in a ring around the production well to at least partially circumscribe the production well. A plurality of brine production wells may be arranged in a vicinity of the working fluid injection wells to at least partially circumscribe the working fluid injection wells. Native brine may be injected into some of the working fluid injection wells. Prior to being injected, brine may be thermally augmented by either heating, using a combination of solar thermal energy, waste heat, or geothermal heat from a separate reservoir, or by cooling, using a source of chilled thermal energy. A supplemental working fluid may be injected into some of the working fluid injection wells to augment a pressure in the reservoir formation, to thus drive a flow of the brine up through the production well and up through the brine production wells, together with at least a portion of the supplemental working fluid. The supplemental working fluid may include at least one of make-up brine or water supplied from an external brine or water source. If brine is used, then the brine may comprise brine extracted from a geologic $CO_2$ storage aquifer or it could comprise residual brine that is effluent from a reverse osmosis (RO) desalination plant. If water is used, then the water may comprise effluent from a waste-water treatment facility. The supplemental working fluid may also include at least one of carbon dioxide ($CO_2$) or nitrogen ($N_2$).

In still another aspect the present disclosure relates to a geothermal energy production system for extracting geothermal energy from a reservoir formation. The system may comprise a production well to extract brine from the reservoir formation. A plurality of working fluid injection wells may be arranged in a vicinity of the production well to at least partially circumscribe the production well. A plurality of brine production wells may be arranged in a vicinity of the working fluid injection wells to at least partially circumscribe the working fluid injection wells. Native brine may be injected into some of the working fluid injection wells. A supplemental working fluid may be injected into the supplemental working fluid injection wells to augment a pressure in the reservoir formation, to thus drive a flow of the brine up through the production well and up through the brine production wells, together with at least a portion of the supplemental working fluid.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
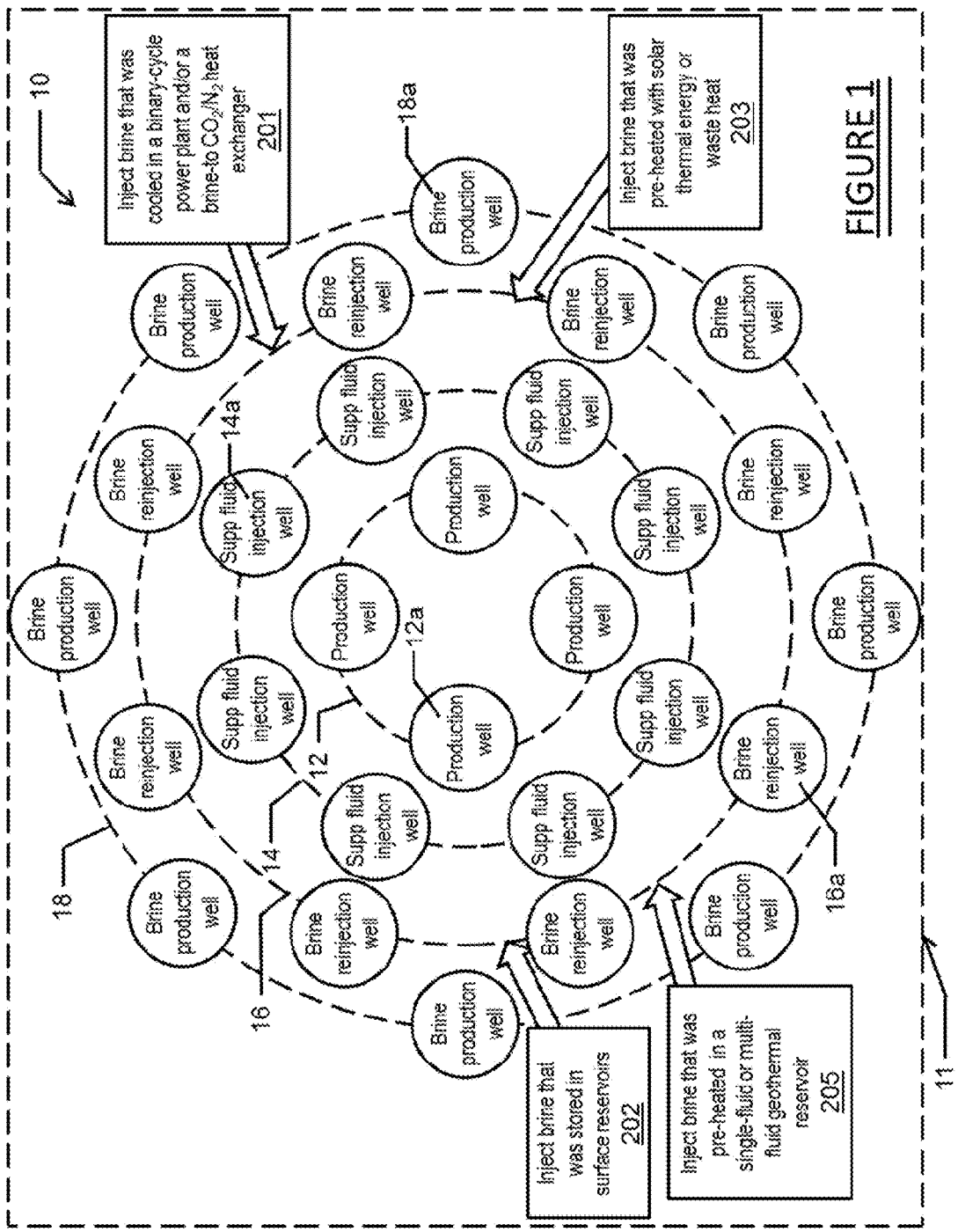
FIG. 1 is a high level plan view of one embodiment of a system in accordance with the present disclosure in which a plurality of rings of wells are used for forming a geothermal energy recovery system.

The following description is merely exemplary in nature and is not intended to limit the present disclosure, application, or uses. It should be understood that throughout the drawings, corresponding reference numerals indicate like or corresponding parts and features.

Referring to FIG. 1, in one embodiment the present disclosure involves a geo-energy system 10 that may be used as (1) a geothermal energy system to recover geothermal energy, (2) a thermal energy storage system to store and dispatch thermal energy, using above-ground sources such as solar thermal energy, or (3) a "hybrid" system that combines geothermal energy recovery with thermal energy storage. The system 10 is located within a geothermal reservoir formation 11. If used for solar thermal energy storage, the system 10 may be located in a subsurface reservoir formation 11 that is not considered to be a geothermal resource. The system 10 may make use of both native brine and a supplemental working fluid to extract geothermal energy. The supplemental working fluids may include supercritical $CO_2$ and supercritical $N_2$. However, it is especially effectively deployed when $N_2$ is included as one of the constituents. Particular advantages of using $N_2$ are that it can be separated from air at low cost, compared to that of captured $CO_2$. Nitrogen is also non-corrosive and will not react with the reservoir formation 11. The addition of $N_2$ can improve the economics of $CO_2$-enabled geothermal energy production and mitigate operational issues associated with $CO_2$. If a two-stage, nitrogen-enriched combustion process is used; the resulting flue gas can have low enough concentrations of oxidants to be a suitable, low-cost source of $N_2$ and $CO_2$. The systems and methods of the present disclosure can also utilize conventional flue gas to extract geothermal energy and methane from deep, unmineable coal seams.

Figure 2:
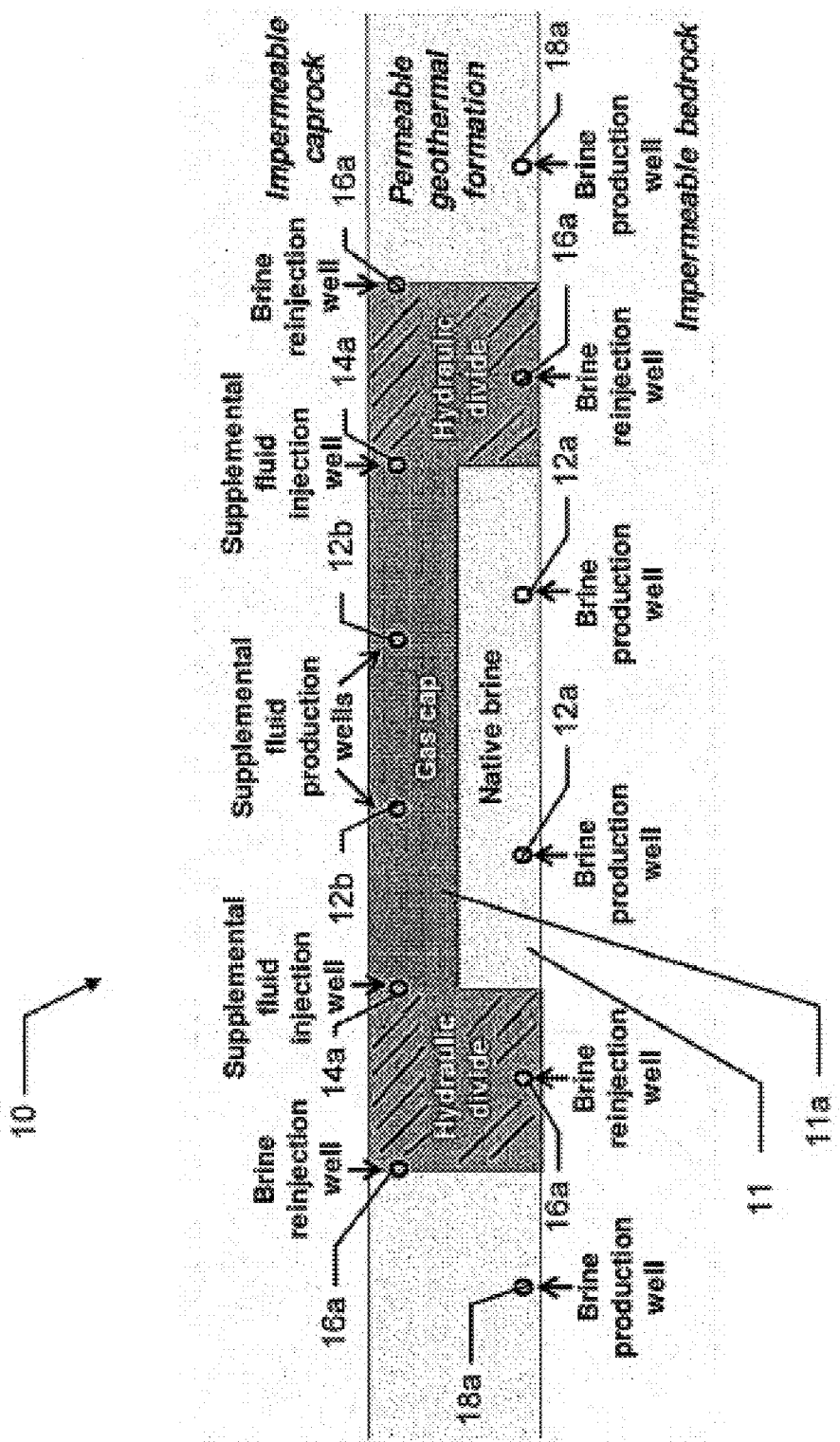
FIG. 2 is a high level side view of one example of how the wells shown in FIG. 1 may be configured at different depths, and also how horizontal wells within a given ring may also be configured at different depths to tailor the system to the specific reservoir formation at which the system is being employed.

In FIG. 1 the system 10 may be deployed with four rings of production and injection wells, which significantly enhances overall efficiency of the system 10. As shown in FIG. 2, the system 10 is deployed in a permeable geothermal reservoir formation 11 that is bounded above and below by an impermeable caprock and impermeable bedrock. The impermeable caprock is important because it confines the vertical migration of the buoyant supplemental fluids ($N_2$ and $CO_2$). The impermeable caprock and bedrock are important to system 10 because they help conserve pressure. An inner ring 12 consists of a plurality of production wells 12a for extracting native brine from the reservoir formation 11. A second ring 14 consists of a plurality of supplemental working fluid injection wells 14a for injecting a supplemental working fluid into the reservoir formation 11. More specifically, the second ring 14 of supplemental working fluid injection wells 14a may be used for injecting $N_2$ and/or $CO_2$ into the reservoir formation 11. A third ring 16 may consist of a plurality of brine re-injection wells 16a for re-injecting extracted native brine back into the reservoir formation 11. A fourth ring 18 of brine production wells 18a may be used to recover portions of the native brine re-injected via the third ring of re-injection wells 16a and to relieve overpressure in areas adjacent to the reservoir formation 11. The inner ring 12 of production wells 12a and the outer ring 18 of brine production wells 18a may be completed at various depths to provide better control of fluid and energy recovery for improved sweep efficiency, which reduces thermal drawdown and increases power generation and its sustainability. The rings of injection wells 14a and 16a may also be completed at multiple depths, as will be described in greater detail herein, to provide better control of fluid and energy recovery. It will be appreciated that a greater or lesser plurality of wells may be included in each of the rings 12-18 than what is shown in FIG. 1. Furthermore, while the wells 12a-18a are shown in FIG. 1 as being arranged generally concentrically, this is not absolutely critical to efficient operation of the system 10. However, the individual wells of the fourth ring of wells 18a are preferably arranged to at least partially circumscribe the third (re-injection) wells 16a, which are in turn preferably arranged to at least partially circumscribe the second (injection) wells 14a, which are in turn preferably arranged to at least partially circumscribe the production wells 12a.

Referring to FIGS. 1 and 2, the multi-ring approach of the system 10 can take advantage of the fact that horizontal well drilling technology allows for precise directional control of the well orientation; hence it is realistic to create precisely curved injection and production intervals. Another important reason for using a plurality of rings 12-18 is to conserve the pressure energy from the injection process and to minimize the loss of the supplemental working fluid. The four-ring configuration (or variations of that configuration) creates a hydraulic divide, which is a distinct region of overpressure as shown in FIG. 2. The four rings 12-18 facilitate a range of pressure management strategies to spread out reservoir overpressure and thereby limit its magnitude, to thus significantly reduce or eliminate the possibility of induced seismicity and leakage of the supplemental working fluid. The hydraulic divide (FIG. 2) that is created by the four-ring configuration of the system 10 shown in FIG. 1 also allows the production wells 12a and 18a to be segregated into two groups, with the inner ring 12 of wells 12a transitioning from brine to supplemental working fluid production, and the outer ring of wells 18a only producing brine. Segregation of the production wells 12a and 18a in this fashion can help simplify well-field operations.

With specific reference to FIG. 2, a high level side view illustrates that the wells within one or more of the rings 12-18 may be located at different depths in the reservoir formation 11. More specifically, the brine re-injection wells 16a may be located at different depths relative to the caprock and bedrock that confine the reservoir formation 11 from above and below. The benefits of the hydraulic divide are that it conserves pressure and supplemental working fluid and segregates the production wells into those that transition from brine to supplemental working fluid production and those that only produce brine. Another important benefit of this configuration is that the large volume of the reservoir formation inside the hydraulic divide can be used to store large quantities of energy. Accordingly, the hydraulic divide is analogous to how a dam functions in storing energy for hydroelectricity generation. A plurality of production wells 12a and 12b are also included for initially extracting native brine and eventually extracting the supplemental working fluid from a gas cap 11a overlying the native brine within the reservoir formation 11. Wells 12b are used for extracting supplementing working fluid ($N_2$ and/or $CO_2$) from the gas cap 11a. The gas cap gradually expands vertically downward with time, driving native brine to production wells 12a, using a process called gravity-drainage double-displacement.

The multiple, concentric-ring well design described above is well adapted to store pressure and supplemental fluid ($CO_2$ and/or $N_2$), much like how a hydroelectric dam stores potential energy. Stored pressure can generate large artesian flow rates, providing much better leveraging of well costs. Because fluid production is driven by stored pressure, it becomes possible to schedule production (and highly dispatchable power generation) to coincide when power demand is high or when there is a deficit of renewable energy on an electrical power grid that the system is in communication with. Reservoir analyses show that it does not require much supplemental fluid ($CO_2$ or $N_2$) injection to substantially enhance the rate of brine production and power generation. A significant benefit of $CO_2$ or $N_2$ injection is that it generates excess brine for re-injection through displacement; however, there is an additional, more subtle, and more profound benefit of this injection process. That benefit is in altering the pressure distribution within the reservoir. It has been determined that only a relatively small amount of $CO_2$ or $N_2$ is needed to create a "topographic high" in pressure (hydraulic divide in FIG. 1), providing the opportunity to inject pressurized brine in the third ring of brine reinjection wells (16a) that sit on top of the hydraulic divide "uphill" from the "downhill" outer brine production wells (18a).

It is also important to understand that the supplemental fluid used to generate the topographic high in pressure distribution does not need to be $CO_2$ or $N_2$; rather, it may be make-up brine extracted from a separate reservoir. Alternatively, the supplemental fluid may be make-up water from a separate source. In one example the make-up water may be effluent from a wastewater treatment plant. Make-up brine can be excess brine that is replaced by supplemental-fluid ($CO_2$ and/or $N_2$) injection in a multi-fluid geothermal reservoir or it can be brine extracted for the purpose of pressure management in a geological $CO_2$ storage (GCS) operation. Make-up brine can also be the effluent from a reverse osmosis (RO) desalination plant. Thus, the first family of embodiments of this disclosure replaces $CO_2$ and/or $N_2$ with brine or water as the supplemental fluid that is injected for the purpose of pressure augmentation.

Figure 3:
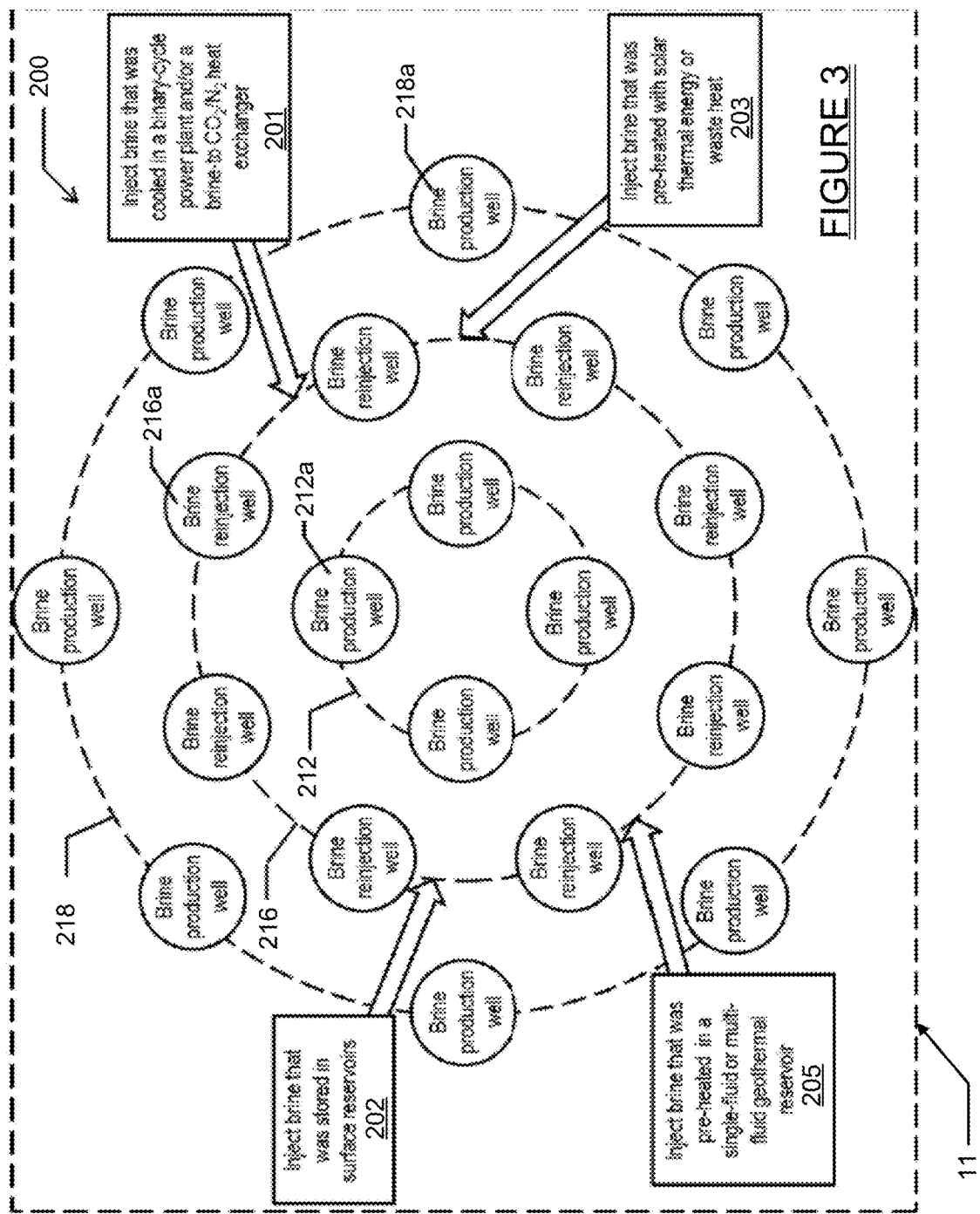
FIG. 3 is a high level plan view of a single-fluid geothermal/STES or CTES reservoir system, where STE stands for solar thermal energy storage and CTES stands for chilled thermal energy storage.
Figure 4:
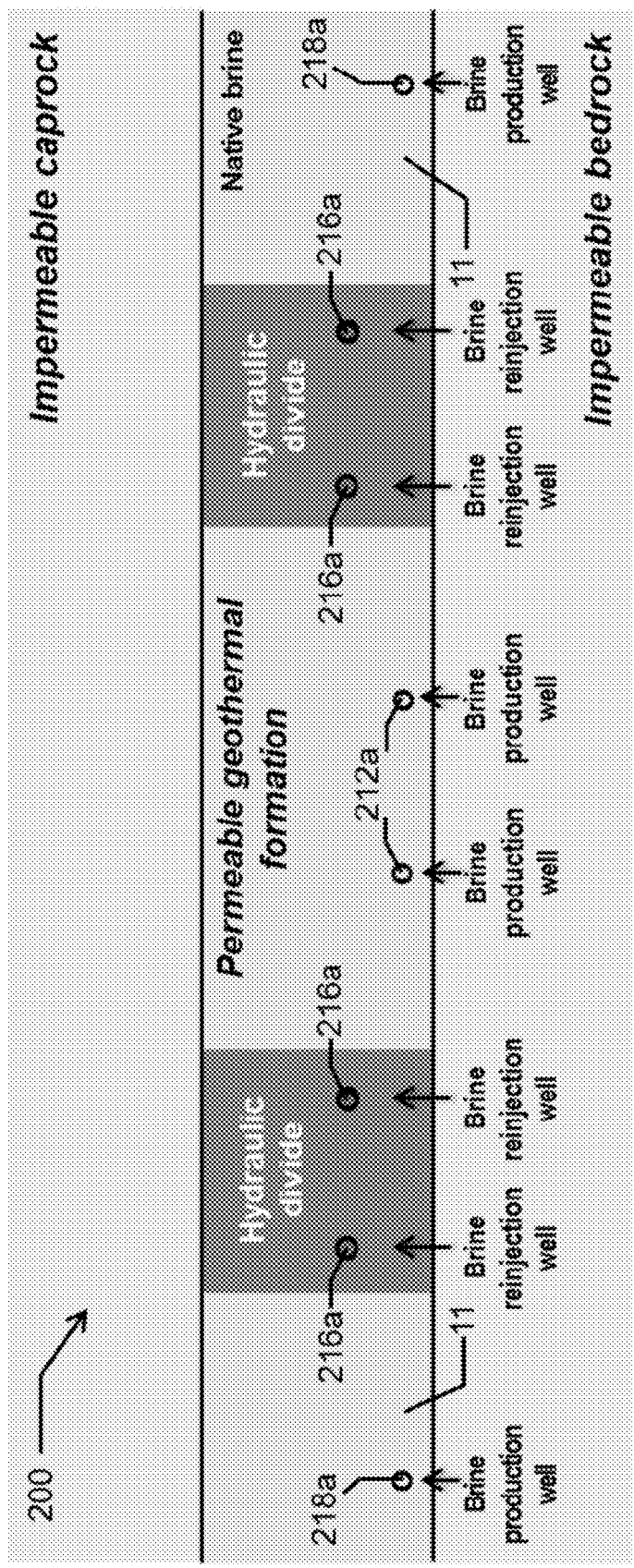
FIG. 4 is a high level side view of a single-fluid geothermal/STES or CTES reservoir system.

As shown in FIGS. 3 and 4, this approach may be implemented with a concentric multi-ring system 200 (FIG. 3) similar to that of FIG. 1. The system 200 of FIG. 3 makes use of preferably at least three concentric well rings: (1) an inner ring 212 of brine production wells 212a, (2) a middle ring 216 of brine reinjection wells 216a, and (3) an outer ring 218 of brine production wells 218a. For the three well-ring configuration, brine reinjected in the middle ring 216 of wells 216a is "uphill" from the "downhill" inner and outer brine production wells 212a and 218a. This pressure augmentation process can be thought of as the subsurface equivalent of "pumped-storage" hydroelectricity. Subsurface pumped storage can drive large brine production rates while generating highly dispatchable power. Furthermore, this can be accomplished without requiring submersible pumps to lift brine up through the production wells 212a and 218a. Large centralized pumps located on the surface are expected to be even more efficient than submersible pumps. Surface-based pumps will not be exposed to harsh conditions that often occur in brine production wells and would not require the maintenance that can disrupt brine production and power output of geothermal energy systems. Pumped storage is expected to be particularly valuable in hydrostatic reservoirs where temperatures are too hot (>200° C.) for submersible pumps to survive and operate. Where horizontal wells are used, pumped storage may drive flow rates much greater than the capacity of submersible pumps (typically 80 to 120 kg/sec), which would increase leveraging of well costs. This family of embodiments is significant because it enables heat to be extracted from a geothermal resource without the added complexity associated with introducing a working fluid with significantly different thermophysical properties and chemistry from those of native brine, such as would be the case with supercritical $CO_2$. Hence, this approach allows a geothermal system to rely on existing geothermal technology and methods, when such technology and methods are used in connection with the energy-efficient, concentric-ring well configuration shown in FIG. 3, and the possible use of horizontal wells.

Time-Shifting the Parasitic Loads of Brine Pumping, $N_2$ Separation, and $N_2$ Pumping for BES and Grid-Stabilizing Power Generation Capacity Another family of embodiments of the present disclosure enables subsurface pressure storage, which in turn enables bulk energy storage (BES) and a grid-stabilizing power generation capability, such as load following. A load-following power generation capability is becoming increasingly necessary with increasing penetration of intermittent renewables on power grids. For liquid-dominated geothermal reservoirs under hydrostatic pressure conditions, a significant fraction of gross power output is consumed with the parasitic load required to lift the brine up through the production wells 212a, which is typically achieved with submersible electrical pumps. Some additional parasitic load typically also results because of the overpressure required to overcome frictional losses in the brine reinjection wells 216a. Because the multiple concentric-ring well design of FIGS. 1, 2, 3 and 4 discussed herein store pressure much like a hydroelectric dam, the majority of the overall parasitic load is that associated with brine pumping, i.e., over pressurizing brine for reinjection into the brine reinjection wells (216a in FIGS. 3 and 4). The second largest parasitic load is that associated with separating $N_2$ from air and compressing $N_2$ for injection into supplement fluid injection wells (214a in FIGS. 1 and 2). The parasitic load of brine pumping and/or $N_2$ separation and pumping can be time-shifted to coincide with periods when power supply exceeds power demand, such as what may occur when there is an excess supply of intermittent renewable power on the electrical power grid.

Figure 5:
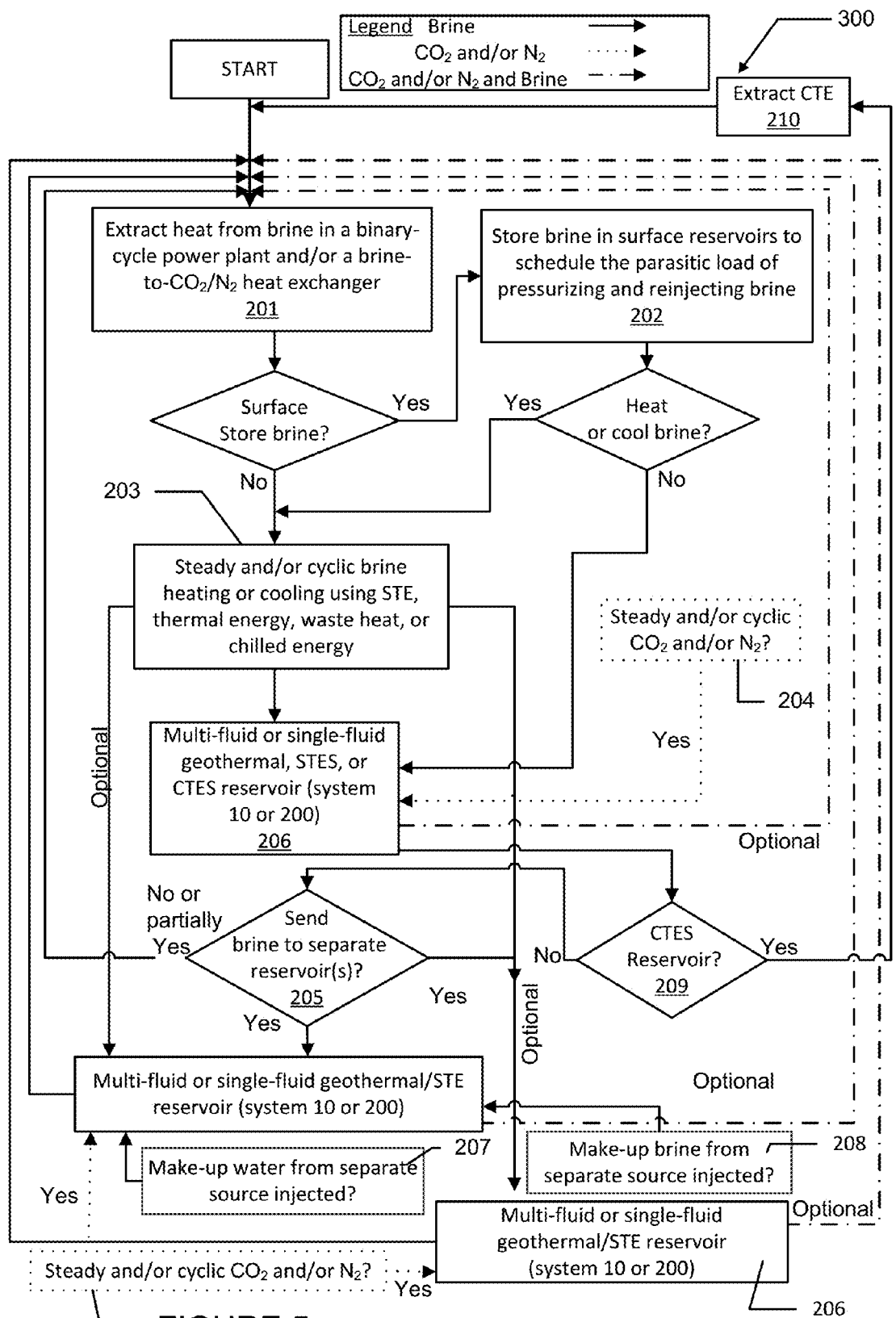
FIG. 5 is a high level flowchart illustrating a plurality of operations that may be implemented using the systems shown in FIGS. 1-4.

With further reference to FIGS. 1 and 3, parasitic-load time-shifting can be accomplished by temporarily storing brine in a surface reservoir (operation 202 in FIGS. 1 and 3), which is best done when power demand exceeds power supply on electricity grids. It should be noted that time-shifting the parasitic load of $N_2$ separation and pumping does not require the temporary storage of $N_2$ because $N_2$ can be readily separated from air. Time-shifting both of these parasitic loads allows the net power output to be close to gross power output during the time that the parasitic loads are not imposed, which is useful when power demand exceeds supply. Time-shifting the parasitic load of brine pressurization and injection to periods when power supply exceeds demand on electricity grids can be accomplished using a wide range of operational combinations (FIG. 5). One such example is to produce brine (operation 205 in FIGS. 1, 3, and 5) from a typically shallow reservoir and immediately pressurizing and reinjecting it into a separate (typically deeper and hotter reservoir) reservoir. Thus, Operation 205 allows brine that has been pre-heated in the shallower reservoir to be injected into (and to improve heat recovery from) the deeper reservoir. This will be discussed further in connection with operation 205 in FIG. 5.

Parasitic-load time-shifting can provide the capacity to soak up excess power from electrical power grids during periods of over-generation. This can be very valuable where the penetration of photovoltaic (PV) power into grids is becoming high, such as in California. For example, from about 11 AM in the morning to about 2 PM in the afternoon, during the spring and fall when the air conditioning load is light and PV power supply is high, parasitic-load time-shifting may be used to soak up excess power from the electrical power grid. Where the penetration of wind power is high, parasitic-load time-shifting could soak up excess power at night (e.g., during a 3-to-4-hour window) when wind speeds are often high and power demand is low. Thus, as just one example, time-shifting the parasitic loads of brine pumping and of $N_2$ separation and pumping could be scheduled in a diurnal fashion, during roughly two 3-to-4-hour windows: one occurring at midday and the other at night.

Grid-stabilizing power generation capacity, such as load following and peaking power, is needed to compensate for constantly fluctuating imbalances between supply and demand on electrical power grids. The systems of the present disclosure can accomplish this important function in at least two fundamental ways: (1) adjusting gross power output and (2) adjusting net power output by time-shifting the parasitic load. The second approach can be fine-tuned by modulating how much of the parasitic load of brine pumping (and/or $N_2$ pumping) is imposed at any given time. Organic Rankine cycle (ORC) power turbines and/or direct $CO_2/N_2$ power turbines could be allowed to spin at full capacity, while adjusting the parasitic loads of brine and/or $N_2$ pumping to modulate the net power output of the geothermal plant, which could provide a very rapid and precise response to grid imbalances. In this fashion, the high capital investment in the power turbines could be fully and continuously utilized. BES and load following capacity could be achieved by oversizing the brine-pumping and $N_2$-pumping capacities so that a large fraction of the brine-pumping and/or $N_2$-pumping parasitic loads could be scheduled when it is most advantageous. The additional capital cost of oversizing the brine pumps and the $N_2$ separators and compressors would probably be much less than the capital cost of oversizing the power turbines, which would be necessary if gross power output was being adjusted to respond to imbalances between supply and demand on the grid. Hence, the likely preferred option would be to adjust net power output, rather than to adjust gross power output to provide grid-stabilizing (e.g., load-following and peaking) power generation capacity. This is quite different from conventional load-following and peaking power systems (e.g., gas turbines) where the power plant must function at much less than full capacity to provide the load-following ancillary service. If additional load-following ancillary service is required, the systems and methods disclosed herein can operate to adjust the gross output from the power turbines, which is accomplished by adjusting the rate of heat withdrawal from the geothermal reservoir; however, this may be the second option because it does not allow the most expensive components of the power system to continuously run at full capacity. Because brine production is driven by stored pressure, the systems and methods of the present disclosure can rapidly and precisely adjust the rate of heat withdrawal from the reservoir and gross power output for load following and peaking power.

Hybrid Geothermal/STE Storage and Power Systems

The third family of embodiments of the present disclosure involves thermal augmentation of brine at the ground surface utilizing solar thermal energy (STE) and/or waste heat to further improve upon the year-round dispatchability of one or more renewable energy sources. The availability of solar thermal energy (STE) varies in a highly seasonal and diurnal fashion, placing heavy demands on back-up and load-following power sources (which in turn often emit substantial quantities of $CO_2$). The embodiments of the present disclosure enable the storage of STE in a subsurface reservoir, whether or not that reservoir has temperatures hot enough to be considered an economically viable geothermal resource. The presently disclosed embodiments also enable using STE and/or waste heat to augment reservoir temperatures and thereby enhance the economic viability of a geothermal resource (203 in FIGS. 1, 3, and 5). Even if a relatively low-temperature heat source is used, such as waste heat, thermal augmentation of brine prior to reinjection can reduce the rate of thermal drawdown for a geothermal reservoir system. Thermal augmentation can also be selectively applied to brine that is injected into known "thief zones", which are zones of high permeability where injected fluids preferentially flow. Because the residence time of injected fluid is less in thief zones, there can be insufficient time for the injected fluid to be heated by the reservoir prior to arriving at the production wells. Thus, selectively heating brine that is injected into known thief zones, rather than heating brine that is injected into zones with longer residence time, can mitigate the negative impact of early breakthrough and rapid thermal drawdown. Thus, the embodiments and methods described herein can enhance the productivity of a geothermal resource by potentially extending its operating lifetime.

With the systems and method of the present disclosure, there are various options and combinations of options that can be implemented for the timing of thermal augmentation of brine (brine heating). Brine can be heated in a steady fashion, as may apply to the use of waste heat. Brine may be heated in a cyclic fashion, as would apply to the diurnal and seasonal availability of STE. Temporary storage of brine in surface reservoirs (operation 202 in FIGS. 1, 3, and 5) allows the brine to be available for thermal augmentation when STE is available. Brine heating can be conducted in a multi-stage fashion, by pre-heating brine with waste heat, followed by cyclic heating with STE.

In addition to enhancing the productivity of geothermal resources already having economically viable resource temperatures, the systems and methods of the present disclosure can utilize reservoirs with marginal or even sub-marginal resource temperatures for diurnal and seasonal storage of STE, thereby further enabling BES and load-following power generation. Combined with parasitic-load time-shifting, this approach can be scheduled to take excess power from the grid and store electricity and STE when supplies of photovoltaic (PV) power and concentrating solar power (CSP) are greatest. Because the availability of STE coincides when PV power and CSP supplies are greatest, the systems and methods of the present disclosure can synergistically take power from the grid when there is a surplus of solar power, such as from 11 AM to 2 PM during the spring and fall. This approach is unique by virtue of being the only solar-energy technology believed to exist which is designed to take power from, and deliver power to, the grid with exactly the opposite timing (both diurnally and seasonally) of all other existing solar-energy technologies. If deployed at a sufficiently large scale, the hybrid solar-geothermal approach which the present systems and methods enables could offset diurnal and seasonal variability of solar power being supplied to electricity grids. This in turn would reduce dependence on fossil-energy ($CO_2$-intensive) back-up and load-following power generation systems, while not displacing other low-$CO_2$ power sources, such as nuclear.

Integration of Multi-Fluid and Single-Fluid Geothermal/STES Reservoirs

The fourth family of embodiments enables multi-fluid geothermal/STES reservoirs (such as system 10 in FIG. 1) to be integrated with single-fluid (brine-only) geothermal/STES reservoir (system 200 in FIG. 3). This approach enables brine to be pre-heated in a relatively shallow reservoir with moderate temperatures prior to being injected into a hotter and deeper reservoir. Series looping of brine through two integrated (shallow and deep) reservoirs may be a more efficient power-conversion process than parallel looping of brine in two independent (shallow and deep) reservoirs. This approach also uses $CO_2$ as a working fluid where it is more advantageous (shallower reservoirs with lower temperatures), while using brine as a working fluid where it is more advantageous, such as with deeper/hotter reservoirs. This embodiment family can be combined with other embodiment families (e.g., parasitic-load time-shifting) to increase BES capacity. Another advantageous combination is to pre-heat $CO_2/N_2$ produced from a shallow multi-fluid geothermal reservoir with brine produced from a deeper/hotter reservoir, prior to sending the $CO_2/N_2$ through a direct turbine, as discussed below.

Multi-Fluid Power Conversion: Brine-to-$CO_2/N_2$ Heat Transfer in Surface-Located Heat Exchangers A fifth family of embodiments that may be implemented using the teachings of the present disclosure involves transferring heat from produced brine to produced $CO_2/N_2$ mixtures in a surface-located heat exchanger (201 of FIGS. 1, 3, and 5), thereby taking advantage of the greater power-conversion efficiency of direct $CO_2/N_2$ turbines compared to ORC binary-cycle power plants. This approach is significant because it can generate more power per unit heat extracted from the geothermal reservoir than would be possible for a single-fluid (brine-only) power-conversion process. The Joule-Thomson effect causes $CO_2$ to cool as it loses pressures flowing up the production well and expands. Note that a potential benefit of mixing $N_2$ with $CO_2$ is that $N_2$ will reduce the pressure loss up the borehole, resulting in greater wellhead pressure, which could increase power generated from produced $CO_2$. Because brine loses little temperature as it flows up the brine production well, when it originates from the same reservoir pressure and temperature conditions as did the $CO_2/N_2$, it will always be hotter than produced $CO_2/N_2$. Therefore, there will always be the opportunity for produced $CO_2/N_2$ to be pre-heated by produced brine in a surface heat exchanger prior to it being sent through a direct $CO_2/N_2$ turbine. An operational goal would be to balance the respective brine and $CO_2/N_2$ production rates so that most of the potentially available heat in the produced brine could utilized to pre-heat the $CO_2/N_2$ prior to $CO_2/N_2$ being sent through the direct turbine.

With reference to FIG. 5, a flowchart 300 is presented which shows operational combinations of the embodiments of this disclosure that (1) harvest, (2) store, in the form of thermal energy and bulk energy (pressure), and (3) dispatch renewable energy, in response to real-time and projected requirements of electricity grids. Operations 201, 202, 203, and 210 are executed above ground (surface-located). Systems 10 and 200 and Operations 204, 205, 206, 207, 208, and 209 are executed in the subsurface. Operation 201 converts thermal energy to electricity. Operation 210 extracts chilled thermal energy for cooling purposes, such as with a power plant to boost its efficiency. Operation 202 temporarily stores produced brine in surface-located reservoirs to allow scheduling the parasitic load of pressurization and injection when power supply exceeds demand. Operation 203 harvests and injects/stores thermal energy from above-ground sources (solar, waste heat, and chilled energy) when it is most advantageous to do so. Operation 206 checks whether a subsurface operation is either multi-fluid (System 10) or single-fluid (System 200); Operation 209 checks whether it is run as either a geothermal, geothermal/STES, or CTES reservoir. Operation 205 checks whether the produced brine is totally or partially sent to separate reservoirs or is either totally or partially sent to power turbines and heat exchangers to generate electricity. For multi-fluid reservoirs, operation 204 checks whether the injection of $CO_2$ and/or $N_2$ injection is steady and/or cyclic. Operation 207 checks whether make-up water from a separate source is injected into either multi-fluid or single-fluid reservoirs. Operation 208 checks whether make-up brine from a separate source is injected into either multi-fluid or single-fluid reservoirs.

At operation 206, if a multi-fluid or single-fluid geothermal, STES or CTES reservoir is being used, then a check may be made at operation 209 to determine if the reservoir is a CTES reservoir, and if so, operation 210 may be performed to extract the CTE.

Chilled Thermal Energy Storage (CTES) Reservoir Systems

The sixth family of embodiments enables diurnal and seasonal chilled thermal energy storage (CTES), using the single-fluid, concentric-ring well design (FIGS. 3 and 4) and the first family of embodiments of this disclosure. Seasonal CTES, which utilizes the cold of winter, can be achieved in a number of ways. It can be done by chilling produced brine when it is most advantageous. A possible brine source is that extracted from a geological $CO_2$ storage (GCS) operation for the purpose of pressure management. An example of when conditions are advantageous is at night in the winter when (1) air temperatures are coldest, (2) heat loss by thermal radiation is greatest, and (3) there is excess power on the grid to supply the parasitic load for brine extraction/chilling/reinjection operations. Seasonal CTES can also be achieved by collecting snow and ice removed from roads and highways, which because they sometimes contain de-icing salt may have a saline composition. When CTE is used to chill the inlet air for natural gas and geothermal turbines, it can increase power output by up to 20 percent, which improves peak power capacity and is particularly valuable during the summer months when air temperatures are high. A combination of embodiment families 2 and 6 yields Pumped Chilled Hydro Energy Storage (PCHES). In FIG. 4, the outer ring of brine production wells (218a) can also function as brine reinjection wells.

Ideal attributes for CTES reservoir resources are nearly the antithesis of those for typical geothermal resources. Ideal CTES resources are those with cool temperatures; hence, great depths are not required to attain economically viable temperatures. Because CTE is being replenished on an annual basis, CTES reservoirs can be much smaller than the reservoirs required for sedimentary-basin, geothermal-energy systems. Rather than being a possible hindrance, reservoir compartmentalization can be an asset that is more conducive to subsurface storage of pumped hydro energy. Thus, CTES reservoir systems will have much wider geographic resource potential than sedimentary-basin geothermal-energy systems. This approach can be integrated into a base-load fossil energy plant to improve the economic viability of capturing and storing $CO_2$. This approach can also be integrated into renewable geo-energy systems to enhance BES, STE storage, and load-following power-generation capacities.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A geo-energy production method for extracting thermal energy from a reservoir formation, the method comprising:
   using an at least one production well to extract native brine from the reservoir formation, the at least one production well being disposed at a first elevation within a native brine reservoir of the reservoir formation, and below a gas cap layer of the native brine reservoir formation;
   using at least one first supplemental working fluid production well at a second elevation above the at least one production well, and within the gas cap layer of the native brine reservoir formation;
   arranging a plurality of supplemental working fluid injection wells in a vicinity of the at least one production well to at least partially circumscribe the at least one production well;
   arranging a plurality of brine re-injection wells around the plurality of supplemental working fluid injection wells, to generally circumscribe the plurality of supplemental working fluid injection wells, and further such that a first one of the plurality of brine re-injection wells is located at a different depth from a second one of the plurality of brine re-injection wells;
   injecting a working fluid into the supplemental working fluid injection wells to augment a pressure in the native brine reservoir formation, to thus drive a flow of the native brine up from the native brine reservoir formation through the at least one production well and up through the at least one first supplemental working fluid production well, together with at least a portion of the injected working fluid;
   re-injecting the native brine into the reservoir formation to create a region circumscribing the supplemental working fluid injection wells that forms a hydraulic divide, the hydraulic divide creating a region of overpressure around the native brine reservoir formation; and
   managing a parasitic load associated with the injection of the working fluid, which enables extraction of native brine from the native brine reservoir formation, in a manner to influence a net power output of an electrical power plant associated with an electrical power grid, in a manner which responds to power needs on the electrical power grid.

2. The method of claim 1, wherein the power needs represent real-time power needs or projected power needs.

3. The method of claim 1, wherein controlling the net power output of the electrical plant comprises using bulk energy storage, and wherein the bulk energy storage includes at least one of:
   time-shifting a parasitic load associated with operation of the supplemental working fluid injection wells;
   modulating a parasitic load associated with operation of the supplemental working fluid injection wells; or
   modulating working fluid production.

4. The method of claim 1, further comprising using the working fluid to achieve thermal energy storage, the thermal energy storage including at least one of:
   heated thermal energy storage; or
   chilled thermal energy storage; and
   wherein a thermal energy source used to achieve the thermal energy storage includes at least one of solar thermal energy, waste heat, or chilled thermal energy.

5. The method of claim 1, wherein the plurality of supplemental working fluid injection wells form a generally concentric ring around the at least one production well; and
   further including a plurality of brine production wells arranged to form a generally concentric ring around the supplemental working fluid injection wells.

6. The method of claim 1,
   wherein the brine re-injection wells form a ring that circumscribes the supplemental working fluid injection wells.

7. The method of claim 6, wherein the working fluid injected into the supplemental working fluid injection wells comprises at least one of:
   nitrogen, $N_2$;
   carbon dioxide, $CO_2$;
   water supplied from an external source;
   water comprising effluent from a waste-water treatment facility;
   brine supplied from a separate reservoir formation; or
   brine comprising effluent from a reverse osmosis (RO) desalination plant.

8. The method of claim 1, wherein the working fluid comprises at least one of:
   native brine;
   water supplied from an external source;

water comprising effluent from a waste-water treatment facility;
brine supplied from a separate reservoir formation; or
brine comprising effluent from a reverse osmosis (RO) desalination plant.

9. The method of claim 1, further comprising:
using the geo-energy production method to supplement power being provided to the electrical power grid;
controlling a parasitic load associated with accessing, pressurizing, and injecting the working fluid so that acquisition, pressurization, and injection of the working fluid can be scheduled to occur during a period of at least one of:
when the supply of electrical power exceeds a demand for electrical power on the electrical power grid and there is a need to store bulk energy
when the supply of electrical power exceeds a demand for electrical power on the electrical power grid and there is a need to store, in a modulated manner, bulk energy and
when a demand for electrical power on the electrical power grid exceeds the supply of the electrical power available from the electrical power grid and there is a need to modulate the net power supplied to the electrical power grid.

10. The method of claim 9, further comprising controlling the parasitic load in relation to an availability of at least one of:
solar thermal energy (STE);
chilled thermal energy (CTE); or
wind power; and
wherein at least one of the STE or the wind power is being used to generate electrical power being supplied to the electrical power grid.

11. The method of claim 1, wherein the working fluid is thermally-augmented using at least one of:
waste heat;
solar thermal energy (STE);
solar thermal energy in connection with waste heat; or
chilled thermal energy (CTE); and
wherein the working fluid comprises at least one of:
native brine;
water supplied from an external source;
water comprising effluent from a waste-water treatment facility;
brine supplied from a separate reservoir formation;
brine comprising effluent from a reverse osmosis (RO) desalination plant;
nitrogen ($N_2$); or
carbon dioxide ($CO_2$).

12. The method of claim 1, further comprising thermally augmenting the native brine and/or water that has been temporarily stored at a surface-located reservoir by using at least one of:
waste heat;
solar thermal energy (STE);
solar thermal energy in connection with waste heat; or
chilled thermal energy; and
wherein the surface-located reservoir allows the parasitic load associated with the pressurization and injection of the thermally augmented brine to be scheduled in a manner that responds to at least one of:
the power needs of the electrical power grid;
the availability of waste heat;
the availability of solar thermal energy (STE); or
the availability of chilled thermal energy (CTE).

13. The method of claim 1, wherein the working fluid is pre-heated native brine, using a series looping arrangement involving at least two subsurface reservoirs comprising:
initially injecting the native brine into a first subsurface reservoir to produce a preheated brine; and
subsequently removing the preheated brine from the first subsurface reservoir and injecting the preheated brine into at least one of the supplemental working fluid injection wells in the a second subsurface reservoir, to slow down the rate of thermal depletion of the second subsurface reservoir; and
wherein the option exists for parasitic load associated with the pressurization and injection of the pre-heated brine into the second subsurface reservoir to be scheduled in a manner that responds to the power needs of the electrical power grid.

14. The method of claim 1, further comprising:
transferring heat from the brine after the brine is recovered from the at least one production well, to at least one of carbon dioxide ($CO_2$) or nitrogen ($N_2$) that has been recovered from production wells, the at least one of $CO_2$ and $N_2$ being used to drive an external electrical generating implement.

15. The method of claim 14, wherein the operation of transferring heat comprises using a surface-located heat exchanger to transfer the heat from the brine to the $CO_2$ and/or $N_2$.

16. The method of claim 14, further comprising performing the brine-to-$CO_2$/$N_2$ heat transfer using produced brine wherein the brine comprises brine that has been pre-heated by one of at least
solar thermal energy; or
waste heat; and
performing the pre-heating of the brine during a period of at least one of:
prior to being injected into the supplemental working fluid injection wells in a subsurface reservoir; or
subsequent to being produced up one of at least:
the supplemental working fluid production wells; or
a plurality of brine production wells arranged in a vicinity of the supplemental working fluid injection wells to at least partially circumscribe the supplemental working fluid injection wells.

17. The method of claim 16, wherein the brine is pre-heated using a series looping arrangement involving at least two subsurface reservoirs comprising:
initially injecting brine into a first subsurface reservoir to produce a preheated brine; and
subsequently removing the preheated brine from the first subsurface reservoir and injecting the preheated brine into at least one of the supplemental working fluid injection wells in the at least second subsurface reservoir, to slow down the rate of thermal depletion of the at least second subsurface reservoir.

18. The method of claim 16, wherein the operations of injecting, storing, and producing the pre-heated brine are done in conjunction with a solar thermal energy (STE) power system; and
wherein the solar thermal energy (STE) power system is used to pre-heat the brine during times when a production of solar thermal energy is above a predetermined threshold.

19. A geo-energy production method for use in connection with an electrical power plant supplying electrical power to an electrical power grid, and for extracting thermal energy from a reservoir formation to be used to assist in supplying electrical power to the electrical power grid, the method comprising:
  using an at least one production well to extract native brine from the reservoir formation, the at least one production well being disposed at a first elevation within a native brine reservoir of the reservoir formation, and below a gas cap layer of the reservoir formation;
  using at least one first supplemental working fluid production well disposed at a second elevation above the at least one production well and within the gas cap layer of the reservoir formation;
  arranging a plurality of supplemental working fluid injection wells in a ring around the at least one production well to at least partially circumscribe the at least one production well;
  arranging a plurality of brine production wells in a ring around the ring of supplemental working fluid injection wells to at least partially circumscribe the supplemental working fluid injection wells;
  arranging a plurality of brine re-injection wells around the plurality of supplemental working fluid injection wells, to generally circumscribe the plurality of supplemental working fluid injection wells, and further such that the plurality of brine production wells at least partially circumscribe the plurality of brine re-injection wells, and further such that a first one of the plurality of brine re-injection wells is located at a different depth from a second one of the plurality of brine re-injection wells;
  injecting a working fluid into the supplemental working fluid injection wells to augment a pressure in the reservoir formation, to thus drive a flow of the native brine up through the at least one production well and the at least one supplemental working fluid production well, and up through the brine production wells, together with at least a portion of the injected working fluid;
  re-injecting the native brine into the reservoir formation to create a region circumscribing the supplemental working fluid injection wells that forms a hydraulic divide, the hydraulic divide creating a region of overpressure around the native brine in the reservoir formation; and
  wherein the working fluid comprises at least one of:
    native brine;
    water supplied from an external source;
    water comprising effluent from a waste-water treatment facility;
    brine supplied from a separate reservoir formation; or
    brine comprising effluent from a reverse osmosis (RO) desalination plant;
    nitrogen ($N_2$); or
    carbon dioxide ($CO_2$); and
  using bulk energy storage to also store thermal energy to modify a net power output of the power plant, the bulk energy storage being implemented by
  modulating a parasitic load associated with operation of the supplemental working fluid injection wells, in relation to electrical power available on the electrical power grid.

20. The method of claim 19, further comprising using the geo-energy production method to supplement power being provided to the electrical power grid wherein at least one of a solar energy source or a wind energy source are supplying power to the electrical power grid; and performing the modulating of the parasitic load so that injection of the working fluid occurs during a period of at least one of:
  when power supply exceeds power demand on the electrical power grid; or
  when a surplus supply of at least one of a solar energy source or a wind energy source is being provided to the electrical power grid.

21. The method of claim 19, further comprising pre-heating the at least brine or water prior to injecting the brine and/or water in the brine re-injection wells, wherein the brine and/or water is pre-heated with at least one of solar thermal energy or waste heat.

22. A geo-energy production system for use in connection with a power plant supplying electrical power to an electrical power grid, and for extracting thermal energy from a reservoir formation, the system comprising:
  at least one production well to extract native brine from the reservoir formation, the at least one production well being disposed at a first elevation within a native brine reservoir of the reservoir formation, and below a gas cap layer of the reservoir formation;
  using at least one first supplemental working fluid production well disposed at a second elevation above the at least one production well and within the gas cap layer of the reservoir formation;
  a plurality of supplemental working fluid injection wells arranged in a vicinity of the at least one production well to at least partially circumscribe the at least one production well;
  a plurality of brine production wells arranged in a vicinity of the supplemental working fluid injection wells to at least partially circumscribe the supplemental working fluid injection wells;
  a plurality of brine re-injection wells arranged around the plurality of supplemental working fluid injection wells, to generally circumscribe the plurality of supplemental working fluid injection wells, and further such that the plurality of brine production wells at least partially circumscribe the plurality of brine re-injection wells, and further such that a first one of the brine re-injection wells is located at a different depth from a second one of the brine re-injection wells;
  a working fluid injected into the supplemental working fluid injection wells to augment a pressure in the reservoir formation, to thus drive a flow of the native brine up through the at least one production well and the at least one supplemental working fluid production well, and up through the plurality of brine production wells, together with at least a portion of the working fluid;
  wherein the injection, into the brine re-injection wells, of the native brine produced from the plurality of brine production wells that at least partially circumscribes the plurality of supplemental working fluid injection wells, creates a region circumscribing the supplemental working fluid injection wells that forms a hydraulic divide, the hydraulic divide creating a region of overpressure around the native brine within the reservoir formation; and
  the system being configured to control a net power output of the power plant in a manner that responds to real-time and projected power needs of the electrical power grid.

* * * * *